UNITED STATES PATENT OFFICE.

JAMES HENDERSON, OF BELLEFONTE, PENNSYLVANIA.

PROCESS OF PURIFYING SOLID IRON, PRODUCING THEREFROM MALLEABLE IRON OR STEEL WITHOUT FUSION.

SPECIFICATION forming part of Letters Patent No. 284,551, dated September 4, 1883.

Application filed August 3, 1883. (No specimens.)

*To all whom it may concern:*

Be it known that I, JAMES HENDERSON, of Bellefonte, Centre county, State of Pennsylvania, (formerly of New York city,) have invented a new and useful Process of Purifying Solid Iron, Producing Therefrom Malleable Iron or Steel without Fusion, by Means of Oxygen and Hydrogen Gases, of which the following is a full, clear, and exact description and specification.

The object of this invention is to make iron and steel more economically by using oxygen and hydrogen as reagents.

This my invention is based on the discovery that iron, when exposed to an oxidizing-flame, which also contains the elementary constituents of water, either in the state of combination or dissociation, and the iron is not covered or protected from the action of the flame by a covering of cinder, slag, or other material, the iron, while in the solid condition, may be purified of carbon, sulphur, and phosphorus by the action of said flame or some of its constituents, and that these elements pass off in the gaseous form.

In carrying out this my invention I prefer to use the apparatus described in my application for Letters Patent No. 87,393, Patent No. 283,484, August 21, 1883; and the preferred mode of producing the hydrogen and oxygen gases is to charge coal into the gas-producer of that apparatus, or into one similar to that described in the said previous application, the coal to be such as will produce at least one part, by volume, of hydrogen (more is of no disadvantage) to every three parts, by volume, of carbonic oxide produced by the admission of air at the tuyeres of the producer, and when the fuel does not produce this proportion of hydrogen, steam, preferably superheated, is introduced into the producer among the incandescent fuel, where by its decomposition into hydrogen and oxygen enough hydrogen is obtained, while the oxygen combines with its one equivalent of carbon and becomes carbonic oxide. The hydrogen thus supplied should be in the proportion of at least one-third of the volume of carbonic oxide produced by the joint action of the oxygen of the decomposed steam and the oxygen of the air blown in at the tuyeres. The mixture of gases thus produced is supplied with the requisite quantity of air to produce complete combustion, a portion of said air, or the oxygen of it, combining with the hydrogen and producing vapor of water or its elementary constituents intensely heated, and another portion of said air combining with the carbonic oxide to form carbonic acid. The requisite quantity of air for this purpose may be applied by the means described in my previous application, No. 87,393, Patent No. 283,484, August 21, 1883.

The iron to be treated is heated in the flame to a degree just below the point of fusion, or thereabout, care being taken to prevent the heating of the iron to the fusing-point, either by supplying a less quantity of the mixture of the gases than is sufficient to fuse the quantity of metal under treatment at one operation, or by the use of an excess of air over that required for complete combustion, or by supplying vapor of water to the flame, in order to reduce the temperature below the point of fusion of the article under treatment. The highly-heated gases, impinging on the iron, form, as I believe, gaseous compounds with the carbon, sulphur, and phosphorus, which pass off in the gaseous form, thus depurating the iron, and the iron is maintained at the said temperature and subjected to the action of the said flame until the depuration is accomplished. The cast-iron to be thus treated may be cast-iron in the form of pigs, ingots, or molded castings, and it is preferred to use such cast-iron as contains a low percentage of silicon—say not exceeding half of one per cent.—such as white cast-iron, or desiliconized cast-iron of the various well-known steel processes, or mixed metal produced by melting wrought-iron and cast-iron together, or by melting cast-iron and ferro-manganese or its equivalent together; but gray cast-iron may be used and good results obtained.

The metal to be treated, whether in the form of pigs, ingots, or molded castings, may be removed from the molds in which it has been cast as soon as it is solid enough to be handled, and may be charged upon the hearth of the furnace or purifying-chamber in which it is to be subjected to the action of the flame hereinbefore described, the length of time of the exposure of the articles and the temperature of the flame being so regulated as not to produce fusion, and to wholly or partially remove the carbon to produce steel or decarbonized iron, which, if desired, may be subsequently hammered or rolled. The temperature should approach the fusing-point of the metal, and not exceed it, being, say, not higher than from 300° to 500° Fahrenheit below the point required to fuse the articles under treatment. The exposure of the metal should be approximately from one to six hours, according to the size and thickness of the articles and the amount of decarbonizing required. After the exposure of the articles in the furnace or chamber until they are decarbonized to the desired degree, the hearth containing them may be removed from the furnace, and the articles in their hot condition may be taken immediately to the hammer or rolls, or may be permitted to cool gradually by covering them while on the hearth with a suitable cover—such, for example, as a movable cover of brick-work or a covering of dry sand.

If the foregoing process be practiced upon a desiliconized cast-iron containing manganese varying from 0.05 of one per centum to one-half of one per centum and cast into suitable forms, the product will be cast-steel or wrought-iron, according to the length of time during which it has been treated. So, also, if the desiliconized iron does not contain manganese, this may be added to the iron before its treatment in the form of spiegeleisen, ferro-manganese, or other metallic compound of iron, carbon, and manganese by melting the iron and the additional material together and casting the mixture in suitable molds. The articles so produced, when subjected to the process, will be converted into steel or wrought-iron, which will be free from redshortness when heated and hammered or rolled.

It will be understood that when using the form of furnace hereinbefore referred to, as described in my said application No. 87,393, Patent No. 283,484, August 21, 1883, for working my present invention, the articles to be treated may be placed in either or both hearths and subjected thereon to the action of the gases under the various conditions above set forth. Vapor of water impinging on iron heated to high temperatures decomposes to oxygen and hydrogen and cools the metal, so that in order to produce the proper chemical action upon the metal by its use it becomes necessary to heat the metal with fuel.

For the purposes of this invention other combustible gases—such as illuminating-gas, or that derived from gas-wells, or by the volatilization of hydrocarbons which may contain the required proportions of hydrogen to carbon, and when mixed with air and used substantially as hereinbefore described—become the equivalents of the gaseous fuel hereinbefore described.

I wish it to be understood that I do not limit myself to any special form of gas producer or furnace, as any form of apparatus in which the metal may be maintained at a temperature approaching fusion, and subjected to flame produced by the complete combustion of gaseous fuel containing the equivalents of at least one-third, by volume, of hydrogen to the carbonic oxide, will answer the purpose.

I do not claim in the present application, broadly, the purification of iron and steel by the use of a flame produced by the complete combustion of gaseous fuel containing carbon and hydrogen, as the treatment of liquid iron by these means forms the subject of pending application for Letters Patent heretofore filed by me; nor do I claim as a part of this invention the annealing of steel castings, as this forms the subject of application No. 86,849, filed by me, of which this is a division.

I am aware of English Patent No. 3,840, A. D. 1874, wherein is described a process for annealing purified-steel castings by means of a flame produced by burning mixtures of gas and air, which is inoperative by reason of the proportions given of gas and air or oxygen— "one to eight to fifteen of air or oxygen"—being such as will produce results the reverse of those intended, and impracticable from the difficulty of production and excessive cost of the gas named—carbureted-hydrogen or marsh-gas, ($C_2H_4$). I therefore do not claim the use of this marsh-gas, nor the proportions there given of air or oxygen therewith, as a part of this invention.

What I claim as new, and desire to secure by Letters Patent, is—

1. The process of purifying cast-iron, producing therefrom malleable iron or steel, substantially as before described, which consists, first, in charging the solid metal (whether crude iron or iron wholly or partially desiliconized) into a suitable chamber; secondly, in providing a gaseous fuel containing carbon and hydrogen in proportions described, and mixing air therewith in quantity properly regulated to produce complete combustion and a homogeneous flame previous to its admission to said chamber; and, thirdly, in burning the mixture and causing the homogeneous flame to impinge upon the metal in said chamber and heat it to a temperature less than that required to produce fusion, thereby producing the purification of the metal.

2. The process, substantially as before described, of making depurated castings of iron or steel, which consists, first, in casting the molten metal into articles of the desired shapes; second, in charging the said articles into a suitable chamber, wherein they can be raised to a temperature just below fusion, or thereabout; third, in providing a gaseous fuel containing carbon and hydrogen in proportions described, and mixing therewith air regulated in quantity to produce complete combustion of the gases and a homogeneous flame previous to its admission to said chamber; and, fourth, in burning the mixture, causing the homogeneous flame to impinge upon the said articles, and heat the same to a temperature approaching that required to produce their fusion.

3. The process, substantially as before set forth, of making depurated articles of iron or steel free of redshortness, which consists, first, in melting the iron with the addition of ferromanganese, (or its equivalent;) second, in casting the molten metal into articles of the desired form; third, in charging the said articles into a suitable chamber, wherein they may be heated to a temperature just below that, of fusion, or thereabout; fourth, in providing a gaseous fuel containing carbon and hydrogen in proportions described, mixing therewith air regulated in quantity to produce complete combustion of the gases and a homogeneous flame previous to its admission into said chamber; and, fifth, in causing the homogeneous flame to impinge upon the said articles and heat the same to a temperature approaching that required to produce their fusion.

JAMES HENDERSON.

Witnesses:
GEO. M. LOCKWOOD,
WM. H. DE LACY.